(12) United States Patent
Landers

(10) Patent No.: US 12,007,490 B2
(45) Date of Patent: Jun. 11, 2024

(54) WIRELESS LOCATION ASSISTED ZONE GUIDANCE SYSTEM INCORPORATING SECURE TRANSMISSION OF LOCATION

(71) Applicant: GPSip, Inc., Oshkosh, WI (US)

(72) Inventor: Rodney P. Landers, Stillwater, MN (US)

(73) Assignee: GPSip, Inc.

( * ) Notice: Subject to any disclaimer, the term of this patent is extended or adjusted under 35 U.S.C. 154(b) by 929 days.

(21) Appl. No.: 17/026,154

(22) Filed: Sep. 18, 2020

(65) Prior Publication Data

US 2021/0080595 A1 Mar. 18, 2021

Related U.S. Application Data

(60) Provisional application No. 62/902,325, filed on Sep. 18, 2019.

(51) Int. Cl.

| | |
|---|---|
| *G01S 19/42* | (2010.01) |
| *G01S 19/30* | (2010.01) |
| *G06F 21/60* | (2013.01) |

(52) U.S. Cl.
CPC .............. *G01S 19/42* (2013.01); *G01S 19/30* (2013.01); *G06F 21/602* (2013.01)

(58) Field of Classification Search
None
See application file for complete search history.

(56) References Cited

U.S. PATENT DOCUMENTS

| | | |
|---|---|---|
| 4,393,448 A | 7/1983 | Dunn et al. |
| 4,590,569 A | 5/1986 | Rogoff et al. |

(Continued)

FOREIGN PATENT DOCUMENTS

| | | |
|---|---|---|
| DE | 202004011942 U1 | 12/2004 |
| WO | WO 94/27268 A1 | 11/1994 |

(Continued)

OTHER PUBLICATIONS

"Boundary Plus Computer Collar Unit Owner's Manual", Invisible Fence, 10 pages.

(Continued)

*Primary Examiner* — Aniss Chad
*Assistant Examiner* — Mahmoud M Kazimi
(74) *Attorney, Agent, or Firm* — Albert W. Watkins

(57) ABSTRACT

A fully self-contained portable location tracking device autonomously compares a current location with a latitude-longitude map stored in memory. The latitude-longitude map stores guidance zone values indicative of a predetermined safe zone, progressive alert zones, and a predetermined reference point. The guidance zone values represent actions to be taken based upon current location. When initiated by some combination of current location or zone value, location history, and time, or when otherwise queried, the tracking device transmits the offset from reference location, rather than actual current location data, to at least one wireless communications monitoring apparatus. When further security is desired, the transmitted offset is also digitally encrypted or otherwise obfuscated. The monitoring apparatus also stores a copy of the latitude-longitude map and reference point. Using the received offset, the monitoring apparatus knows both the location of the location tracking device and the actions to be taken based upon current location.

10 Claims, 3 Drawing Sheets

(56) References Cited

U.S. PATENT DOCUMENTS

| | | |
|---|---|---|
| 4,611,209 A | 9/1986 | Lemelson et al. |
| 4,817,000 A | 3/1989 | Eberhardt |
| 4,967,696 A | 11/1990 | Tobias |
| 4,999,782 A | 3/1991 | BeVan |
| 5,043,736 A | 8/1991 | Darnell et al. |
| 5,046,453 A | 9/1991 | Vinci |
| 5,067,441 A | 11/1991 | Weinstein |
| 5,191,341 A | 3/1993 | Gouard et al. |
| 5,351,653 A | 10/1994 | Marischen et al. |
| 5,353,744 A | 10/1994 | Custer |
| 5,355,140 A | 10/1994 | Slavin et al. |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,450,329 A | 9/1995 | Tanner |
| 5,491,486 A | 2/1996 | Welles, II et al. |
| 5,568,119 A | 10/1996 | Schipper et al. |
| 5,587,904 A | 12/1996 | Ben-Yair et al. |
| 5,594,425 A | 1/1997 | Ladner et al. |
| 5,751,612 A | 5/1998 | Donovan et al. |
| 5,791,294 A | 8/1998 | Manning |
| 5,857,433 A | 1/1999 | Files |
| 5,868,100 A | 2/1999 | Marsh |
| 5,870,741 A | 2/1999 | Kawabe et al. |
| 5,911,199 A | 6/1999 | Farkas et al. |
| 5,949,350 A | 9/1999 | Girard et al. |
| 6,043,748 A | 3/2000 | Touchton et al. |
| 6,079,367 A | 6/2000 | Stapelfeld et al. |
| 6,114,957 A | 9/2000 | Westrick et al. |
| 6,172,640 B1 | 1/2001 | Durst et al. |
| 6,184,790 B1 | 2/2001 | Gerig |
| 6,232,880 B1 | 5/2001 | Anderson et al. |
| 6,232,916 B1 | 5/2001 | Grillo et al. |
| 6,236,358 B1 | 5/2001 | Durst et al. |
| 6,263,836 B1 | 7/2001 | Hollis |
| 6,271,757 B1 | 8/2001 | Touchton et al. |
| 6,311,644 B1 | 11/2001 | Pugh |
| 6,313,791 B1 | 11/2001 | Klanke |
| 6,415,742 B1 | 7/2002 | Lee et al. |
| 6,421,001 B1 | 7/2002 | Durst et al. |
| 6,441,778 B1 | 8/2002 | Durst et al. |
| 6,480,147 B2 | 11/2002 | Durst et al. |
| 6,487,992 B1 | 12/2002 | Hollis |
| 6,518,919 B1 | 2/2003 | Durst et al. |
| 6,561,137 B2 | 5/2003 | Oakman |
| 6,581,546 B1 | 6/2003 | Dalland et al. |
| 6,700,492 B2 | 3/2004 | Touchton et al. |
| 6,748,902 B1 | 6/2004 | Boesch et al. |
| 6,903,682 B1 | 6/2005 | Maddox |
| 6,923,146 B2 | 8/2005 | Kobitz et al. |
| 6,943,701 B2 | 9/2005 | Zeineh |
| 7,034,695 B2 | 4/2006 | Troxler |
| 7,259,718 B2 | 8/2007 | Patterson et al. |
| 7,328,671 B2 | 2/2008 | Kates |
| 7,677,204 B1 | 3/2010 | James |
| 7,764,228 B2 | 7/2010 | Durst et al. |
| 7,786,876 B2 | 8/2010 | Troxler |
| 7,856,947 B2 | 12/2010 | Giunta |
| 7,920,066 B2 | 4/2011 | Troxler |
| 8,065,074 B1 | 11/2011 | Liccardo |
| 8,115,642 B2 | 2/2012 | Thompson et al. |
| 8,149,110 B2 | 4/2012 | Troxler |
| 8,155,871 B2 | 4/2012 | Lohi et al. |
| 8,624,723 B2 | 1/2014 | Troxler |
| 8,757,098 B2 | 6/2014 | So et al. |
| 8,797,141 B2 | 8/2014 | Best et al. |
| 8,839,744 B1 | 9/2014 | Bianchi et al. |
| 8,851,019 B2 | 10/2014 | Jesurum |
| 8,955,462 B1 | 2/2015 | Golden |
| 8,957,812 B1 | 2/2015 | Hill et al. |
| 9,015,231 B1 * | 4/2015 | Hodgman .......... H04W 12/02 |
| | | 709/203 |
| 9,226,479 B2 | 1/2016 | Bianchi et al. |
| 9,795,118 B2 | 10/2017 | Landers et al. |
| 9,961,884 B1 | 5/2018 | Landers et al. |
| 10,064,390 B1 | 9/2018 | Landers et al. |
| 10,080,346 B2 | 9/2018 | Landers et al. |
| 10,165,755 B1 | 1/2019 | Landers et al. |
| 10,165,756 B1 | 1/2019 | Landers et al. |
| 10,172,325 B1 | 1/2019 | Landers et al. |
| 10,251,371 B1 | 4/2019 | Landers et al. |
| 10,292,365 B1 | 5/2019 | Landers et al. |
| 10,342,218 B1 | 7/2019 | Landers et al. |
| 10,405,520 B2 | 9/2019 | Landers et al. |
| 10,455,810 B1 | 10/2019 | Landers et al. |
| 10,470,437 B1 | 11/2019 | Landers et al. |
| 10,624,319 B2 | 4/2020 | Landers et al. |
| 2001/0026240 A1 | 10/2001 | Neher |
| 2002/0196151 A1 | 12/2002 | Troxler |
| 2003/0224772 A1 | 12/2003 | Patzer et al. |
| 2004/0036649 A1 | 2/2004 | Taylor |
| 2004/0108939 A1 | 6/2004 | Giunta |
| 2004/0196182 A1 | 10/2004 | Unnold |
| 2005/0034825 A1 | 2/2005 | Giunta |
| 2005/0066912 A1 | 3/2005 | Korbitz et al. |
| 2005/0143909 A1 * | 6/2005 | Orwant .................. G01S 5/0294 |
| | | 701/408 |
| 2006/0027185 A1 | 2/2006 | Troxler |
| 2006/0061469 A1 | 3/2006 | Jaeger et al. |
| 2006/0197672 A1 | 9/2006 | Talamas, Jr. et al. |
| 2007/0204804 A1 | 9/2007 | Swanson et al. |
| 2007/0219705 A1 | 9/2007 | Bitar et al. |
| 2008/0036610 A1 | 2/2008 | Hokuf et al. |
| 2008/0162034 A1 | 7/2008 | Breen |
| 2008/0216766 A1 | 9/2008 | Martin et al. |
| 2008/0246656 A1 | 10/2008 | Ghazarian |
| 2008/0252527 A1 | 10/2008 | Garcia |
| 2009/0102668 A1 | 4/2009 | Thompson et al. |
| 2009/0267832 A1 | 10/2009 | Hymel |
| 2009/0289844 A1 | 11/2009 | Palsgrove et al. |
| 2009/0292426 A1 | 11/2009 | Nelson et al. |
| 2009/0325594 A1 | 12/2009 | Lan et al. |
| 2010/0139576 A1 | 6/2010 | Kim et al. |
| 2011/0148634 A1 | 6/2011 | Putz |
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2011/0298615 A1 | 12/2011 | Rich et al. |
| 2012/0000431 A1 | 1/2012 | Khoshkish |
| 2012/0220314 A1 | 9/2012 | Altman et al. |
| 2012/0312250 A1 | 12/2012 | Jesurum |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0265165 A1 | 10/2013 | So |
| 2013/0307688 A1 | 11/2013 | Hoffman et al. |
| 2013/0324166 A1 | 12/2013 | Mian et al. |
| 2014/0230755 A1 | 8/2014 | Trenkle et al. |
| 2014/0232541 A1 | 8/2014 | Trenkle et al. |
| 2014/0251233 A1 | 9/2014 | Bianchi et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0216142 A1 | 8/2015 | Landers et al. |
| 2016/0015004 A1 | 1/2016 | Bonge |
| 2016/0021849 A1 | 1/2016 | Loosveld |
| 2016/0371984 A1 | 12/2016 | Macfarlane et al. |
| 2017/0156294 A1 | 6/2017 | Landers et al. |
| 2018/0055011 A1 | 3/2018 | Landers et al. |
| 2019/0021283 A1 | 1/2019 | Landers et al. |
| 2019/0113625 A1 * | 4/2019 | Farmer .................. G01S 19/072 |
| 2019/0133084 A1 | 5/2019 | Landers et al. |
| 2019/0141953 A1 | 5/2019 | Landers et al. |

FOREIGN PATENT DOCUMENTS

| | | | |
|---|---|---|---|
| WO | WO 2005/064358 A1 | 7/2005 | |
| WO | WO-2005064358 A1 * | 7/2005 | .......... G01S 5/0027 |
| WO | WO 2015/142962 A1 | 9/2015 | |

(56) References Cited

FOREIGN PATENT DOCUMENTS

| WO | WO 2019/182919 A1 | 9/2019 |
|----|----|----|
| WO | WO 2020/142089 A1 | 7/2020 |
| WO | WO 2020/145941 A1 | 7/2020 |

OTHER PUBLICATIONS

"Global Pet Finder GPS Pet Tracker", http://www.amazon.com/Global-Pet-Finder-GPS-Tracker/, Nov. 19, 2013, 5 pages.
"Tagg—The Pet Tracker Master Kit, White by Snaptracs, Inc.", http://www.amazon.com/TAGG-The-Pet-Tracker-Guard/, Nov. 19, 2013, 5 pages.
"Boundary Plus", http://www.invisiblefence.com/find-the-right-solution/, Jan. 29, 2013, 3 pages.
"Lookup_table", http://www.Wikipedia.org/wiki/Lookup_table, Feb. 15, 2013, 10 pages.
"SkyFence: Our_Product", http://www.gpspetfence.homestead.com/resources.html, Jan. 29, 2013, 3 pages.
"SkyFence: Purchase", http://www.gpspetfence.homestead.com/Purchase.html, Jan. 29, 2013, 2 pages.
"Tagg: About Us", http://www.pettracker.com/about-tagg, Jan. 29, 2013, 1 page.
"Kalman Filter", Wikipedia, https://en.wikipedia.org/wiki/Kalman_filter, Jan. 18, 2016, 37 pages.
Skinner, B. F., "Superstition in the Pigeon", Journal of Experimental Psychology, vol. 38, pp. 168-172, 1948.

\* cited by examiner

WIRELESS LOCATION ASSISTED ZONE GUIDANCE SYSTEM INCORPORATING SECURE TRANSMISSION OF LOCATION

CROSS REFERENCE TO RELATED APPLICATIONS

The present application claims the benefit of U.S. provisional patent application 62/902,325 filed Sep. 18, 2019 of like title and inventorship, the teachings and entire contents which are incorporated herein by reference.

BACKGROUND OF THE INVENTION

1. Field of the Invention

This invention pertains generally to electrical communications, and more particularly to condition responsive indicating systems with a wireless communications link, at least one wireless communications monitoring apparatus, and at least one portable location tracking device. In one preferred manifestation, a fully self-contained portable location tracking device designed in accord with the teachings of the present invention monitors location relative to both of a predetermined area and a predetermined reference point, and securely communicates status to the at least one wireless communications monitoring apparatus.

2. Description of the Related Art

With the advent and substantial advancement of Global Positioning Systems (GPS), presently primarily used for navigation, artisans have recognized the opportunity to incorporate GPS technology into personnel tracking and pet containment. Several systems have been proposed in the literature for several decades, but these systems have not as yet advanced and been adopted to the degree that the literature proposes.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, this level of accuracy is completely unacceptable for pet containment, personnel tracking, and machinery monitoring. For exemplary purposes, many residential yards are forty feet wide, or approximately 10 meters. A system that is only accurate to plus or minus ten meters might try to indicate a portable location tracking device as being in either neighbor's yard on any given day or at any given moment, depending upon unpredictable and uncontrollable variables such as atmospheric conditions. As will be readily appreciated, this unpredictable locating will lead to incorrect actions and alerts, when, in fact, the portable location tracking device is within the proper location. In turn, this will seriously erode confidence in the system, and can lead to very undesirable disregard for alerts issued by the apparatus.

Another limitation is the amount of calculation required to determine whether the portable location tracking device is within a selected area. Most prior art GPS systems use nodes to define the perimeter, and then mathematically calculate where the portable location tracking device is relative to the nodes. Unfortunately, this requires a substantial amount of computation, which increases greatly as the number of nodes are increased. As a result, these systems commonly rely upon a primary processing system that is remote from the portable location tracking device, to which the portable location tracking device is coupled via radio waves or the like. This permits the primary processing system to perform calculations and then relay results or control signals back to the portable location tracking device. Undesirably, this also drains precious battery power, limiting usable time between battery recharge cycles, and again makes the portable location tracking device dependent upon real-time and continuous communication with a monitoring apparatus. In addition, the need for a secondary base station makes the system far less portable. For exemplary and non-limiting purpose, this means that taking the portable location tracking device away from a home base to a park may be impractical or impossible.

A further limitation of the prior art is battery life. A portable location tracking device that must be removed and recharged every few hours is unacceptable for most purposes. Unfortunately, the intensive computations required by prior art systems require either a fast and consequently higher power processor unit, or a high power and essentially continuous communications link such as a radio link to a base station. While the portable location tracking device may transmit data back to the base unit to avoid the need for battery-draining complex computational ability, the apparatus still drains the battery due to the high power required for real-time communications. To be effective for real time behavioral modifications or positional control for moving beings and apparatus such as required in the training and management of animals, the position must be recalculated very frequently, in some cases multiple times each second. As a result, if the base station is going to perform the calculations, then these transmissions must be occurring in real time at that same required rate. This means the communications with the base are commonly being repeated in an almost non-stop and continuously exchanging stream. It will be apparent that walkie-talkies, cellular telephones, and other hand-held radio devices all have very large batteries to provide adequate real-time transmission and reception life, and yet these devices often only support several hours of communications. As can be appreciated, size and weight are severely restricted for a small and portable location tracking device, and the inclusion of a large battery is undesirable.

An additional limitation of the prior art is the blocking or loss of the communications with a base unit. In the prior art, the portable tracking device is entirely dependent upon the base station to provide position information. In the event the communication is lost or interrupted, the portable tracking device is rendered non-functional until communication can be restored.

Yet another limitation of the prior art is the unintentional blocking or loss of GPS signals. There are a number of conditions that can lead to loss of GPS signals. One is unfavorable weather, which can lead to a severely attenuated satellite signal, and much higher Signal to Noise Ratios (SNR). Another condition is an adjacent building, canyon wall, or other obstacle that blocks satellite signals. Such a signal might, for exemplary purposes, either block all signals such as commonly occurs within a building, or instead may only block signals from one direction. However, GPS systems require multiple satellites to obtain a position fix, and even if only one of the satellites is blocked, then the ability to accurately fix position may be lost. Another situation that can lead to signal loss is when the portable location tracking device itself is covered. In such case, then satellite signals may either be blocked or be too severely attenuated.

In any of these situations where the GPS signal is partially or completely blocked or attenuated, the latitudinal and longitudinal positional accuracy will either be inadequate, or may be completely lost. In such instances, a prior art portable location tracking device may become completely non-functional. Worse, this loss of function can occur without notice in an erratic manner, possibly causing severe harm or complete disruption or loss of the intended function.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 by Tanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D)GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 8,155,871 by Lohi et al, entitled "Method, device, device arrangement and computer program for tracking a moving object"; U.S. Pat. No. 8,115,642 by Thompson et al, entitled "Traveling invisible electronic containment perimeter—method and apparatus"; U.S. Pat. No. 8,624,723 by Troxler, entitled "Position and proximity detection systems and methods"; U.S. Pat. No. 8,757,098 by So et al, entitled "Remote animal training system using voltage-to-frequency conversion"; U.S. Pat. No. 8,797,141 by Best et al, entitled "Reverse RFID location system"; U.S. Pat. No. 8,839,744 by Bianchi et al, entitled "Mobile telephone dog training tool and method"; U.S. Pat. No. 8,851,019 by Jesurum, entitled "Pet restraint system"; 2007/0204804 by Swanson et al, entitled "GPS pet containment system and method"; 2008/0252527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; and EP 0699330 and WO 94/27268 by Taylor, entitled "GPS Explorer".

Other US patents and published applications, the teachings and content which are incorporated herein by reference, include: U.S. Pat. No. 4,967,696 by Tobias, entitled "Dog collar"; U.S. Pat. No. 5,046,453 by Vinci, entitled "Animal Training Apparatus"; U.S. Pat. No. 5,491,486 by Welles et al, entitled "Mobile tracking units employing motion sensors for reducing power consumption therein"; U.S. Pat. No. 5,870,741 by Kawabe et al, entitled "Information Management device"; U.S. Pat. No. 6,079,367 by Stapelfeld et al, entitled "Animal training apparatus and method"; U.S. Pat. No. 6,415,742 by Lee et al, entitled "Dual transmitter pet confinement and training system"; U.S. Pat. No. 6,943,701 by Zeineh, entitled "Vehicular safety system and method"; U.S. Pat. No. 7,764,228 by Durst et al, entitled "Portable position determining device"; U.S. Pat. No. 7,786,876 by Troxler, entitled "Large area position/proximity correction device with alarms using (D)GPS technology"; U.S. Pat. No. 7,856,947 by Giunta, entitled "Wireless fencing system"; U.S. Pat. No. 7,920,066 by Troxler, entitled "Large area position/proximity correction device with alarms using (D)GPS technology"; U.S. Pat. No. 8,065,074 by Liccardo, entitled "Configurable inertial navigation system with dual extended kalman filter modes"; U.S. Pat. No. 8,149,110 by Troxler, entitled "Large area position/proximity correction device with alarms using (D)GPS technology"; U.S. Pat. No. 8,155,871 by Lohi et al, entitled "Method, device, device arrangement and computer program for tracking a moving object"; U.S. Pat. No. 8,955,462 by Golden, entitled "System and Method for Remote Guidance of an Animal to and from a Target Destination"; U.S. Pat. No. 8,957,812 by Hill et al, entitled "Position Tracking System and Method Using Radio Signals and Inertial Sensing"; U.S. Pat. No. 9,226,479 by Bianchi et al, entitled "Mobile telephone dog training tool and method"; 2001/0026240 by Neher, entitled "Personal Locations Detection System"; 2004/0108939 by Giunta, entitled "Wireless Fencing System with Tetherless Leash"; 2003/0224772 by Patzer et al, entitled "Dynamic mobile station configuration in wireless communications systems and methods therefor"; 2004/0196182 by Unnold, Entitled "Intelligent Mobile Asset Management System"; 2005/0034683 by Giunta, entitled "Wireless Fencing System"; 2005/0066912 by Korbitz et al, entitled "Method and Apparatus for Training and for Constraining a subject to a specific area"; 2006/0061469 by Jaeger et al, entitled "Positioning system that uses signals from a point source"; 2006/0197672 by Talamas et al, entitled "Virtual fence"; 2008/0036610 by Hokuf et al, entitled "Animal Tracking Apparatus and Method"; 2008/0162034 by Breen, entitled "System and Method for automatically generating sets of geo-fences"; 2008/0246656 by Ghazarian, entitled "Automatic GPS tracking system with passive battery circuitry"; 2009/0102668 by Thompson et al, entitled "Traveling invisible electronic containment perimeter—method and apparatus"; 2009/0267832 by Hymel, entitled "Systems and methods for dynamically determining position"; 2009/0289844 by Palsgrove et al, entitled "Position monitoring system"; 2009/0292426 by Nelson et al, entitled "System and method for controlling a planter"; 2009/0325594 by Lan et al, entitled "Using base-station location to assist mobile-device system acquisition"; 2010/0139576 by Kim et al, entitled "Electronic Fence System"; 2011/0163873 by McIntosh, entitled "Determination of time zone and DST participation"; 2011/0172916 by Pakzad et al, entitled "mobile device positioning in a constrained environment"; 2011/0187537 by Touchton et al, entitled "Time of flight animal monitoring"; 2012/0312250 by Jesurum, entitled "Pet Restraint System"; 2013/0008391 by Berntsen, entitled "Method and system for fencing animals without using a physical fence"; 2013/0141237 by Goetzl et al, entitled "docking system and apparatus to track and stimulate an animal"; 2013/0157628 by kim et al, entitled "Smart phone based electronic fence system"; 2013/0265165 by So, entitled "Position tracking apparatus for training animal"; 2013/0307688 by Hoffman et al, entitled "Personal security and tracking system"; 2013/0324166 by Mian et al, entitled "Method and apparatus using geofence to track individual group members"; 2014/0230755 by Trenkle et al, entitled "Animal Indicator Apparatus"; 2014/0251233 by Bianchi et al, entitled "Mobile telephone dog training tool and method"; 2015/0040839 by Goetzl et al, entitled "Integrated dog tracking and stimulus delivery system"; 2015/0016730 by Miller et al, entitled "Methods, apparatus, and articles of manufacture to measure geographical features using an image of a geographical location"; 2015/0020750 by Jesurum, entitled "Pet restraint System"; 2015/0107531 by Golden, entitled "System and method for remote guidance of an animal to and from a target destination"; and 2016/0021849 by Loosveld, entitled "Method and system for localizing and displaying positions of autonomously mobile objects".

The present inventor has also previously developed various apparatus and methods that have decreased computational requirements and RAM required sufficiently to provide a fully self-contained apparatus that may both track location and take appropriate actions responsive to predetermined zones stored within RAM. The apparatus and associated methods are disclosed in U.S. Pat. No. 9,795,118 entitled "Wireless Location Assisted Zone Guidance System"; U.S. Pat. No. 9,961,884 entitled "Wireless Location Assisted Zone Guidance System Compatible with Large and Small Land Zones"; U.S. Pat. No. 10,064,390 entitled "Wireless Location Assisted Zone Guidance System Incorporating a Multi-Zone Containment Area"; U.S. Pat. No. 10,080,346 entitled "Wireless Location Assisted Zone Guidance System"; U.S. Pat. No. 10,165,755 entitled "Wireless Location Assisted Zone Guidance System Region Lookup"; U.S. Pat. No. 10,165,756 entitled "Wireless Location Assisted Zone Guidance System Incorporating a Rapid Collar Mount and Non-Necrotic Stimulation"; U.S. Pat. No. 10,172,325 entitled "Wireless Location Assisted Zone Guidance System Incorporating Dynamically Variable Intervals Between Sequential Position Requests"; U.S. Pat. No. 10,251,371 entitled "Wireless Location Assisted Zone Guidance System Incorporating a System and Apparatus for Predicting the Departure of an Animal From a Safe Zone Prior to the Animal Actually Departing"; U.S. Pat. No. 10,292,365 entitled "Wireless Location Assisted Zone Guidance System Incorporating Shepherding of Wayward Dogs"; U.S. Pat. No. 10,342,218 entitled "GPS Dog Fence Incorporating Location Guidance and Positive Reinforcement Training"; U.S. Pat. No. 10,405,520 entitled "Wireless Location Assisted Zone Guidance System"; U.S. Pat. No. 10,455,810 entitled "Wireless Location Assisted Zone Guidance System Region Lookup"; U.S. Pat. No. 10,470,437 entitled "Wireless Location Assisted Zone Guidance System"; and U.S. Pat. No. 10,624,319 entitled "Wireless Location Assisted Zone Guidance System Incorporating a Rapid Collar Mount and Non-Necrotic Stimulation"; US published applications 2015/0216142 entitled "Wireless Location Assisted Zone Guidance System"; and 2019/0141953 entitled "Wireless Location Assisted Zone Guidance System Incorporating Dynamically Variable Intervals Between Sequential Position Requests"; and international published applications WO 2015/021116 entitled "Wireless Location Assisted Zone Guidance System"; WO 2019/182919 entitled "Wireless Location Assisted Zone Guidance System Incorporating Secure Transmission of Location"; WO 2020/142089 entitled "Wireless Location Assisted Zone Guidance System Incorporating a Rapid Collar Mount and Non-Necrotic Stimulation"; and WO 2020/145941 entitled "Wireless Location Assisted Zone Guidance System Incorporating Dynamically Variable Intervals Between Sequential Position Requests"; the relevant teachings and content of each which are incorporated herein by reference.

While each of the foregoing patents and published applications have offered tangible features and benefits, there has continued to remain a need for improved methods and apparatus to safely and securely monitor the location of a portable location tracking device. Using the aforementioned technology, a parent is now able to track and monitor the location of a child, a friend can monitor and track the location of another friend, and an elderly patient with dementia can be tracked and monitored, with the intent to keep them safe. These goals are of course desirable and highly beneficial.

However, with the introduction of the various location tracking apparatus has come a sometimes highly undesirable side effect. Not only can a parent track the location of the child, but so can a would-be kidnapper. A valuable package can be tracked not only by the owner, but also by a thief. To reduce the chance for this corruption of an otherwise very beneficial set of tracking apparatuses, a system may be provided with encryption. Unfortunately, not only has encryption improved, but so has the entire field of cryptography, including decryption. While an apparatus today may be provided with an encryption code or apparatus that may be difficult or time-consuming to break, in only a matter of a few short months or years the hardware and software used for cryptography may advance sufficiently to render these encryptions useless against even a poorly skilled hacker. Further, this encryption and decryption requires processor intense operation, which as already noted herein above is quite detrimental to both battery life and hardware costs.

As may be apparent then, in spite of the enormous advancements and substantial research and development that has been conducted, there still remains a need for an improved apparatus that operates in a self-sufficient manner, and that may further safely and securely communicate with a monitoring apparatus.

In addition to the foregoing documents, Webster's New Universal Unabridged Dictionary, Second Edition copyright 1983, is incorporated herein by reference in entirety for the definitions of words and terms used herein.

SUMMARY OF THE INVENTION

Exemplary embodiments of the present invention solve inadequacies of the prior art by providing a lookup table having a reference point. The lookup table and reference point are incorporated into at least one monitoring apparatus and at least one portable location tracking device. In a most preferred embodiment of the invention, the table is defined by rows and columns that are mapped to ordinate and abscissa data points representing predefined geographic locations. Each data point offset in the table corresponds to a predefined geographic offset, for example a latitude and longitude offset. Each datum point in the table stores a value indicative of a particular one of several guidance zones. Each guidance zone has an associated set of characteristics used to provide actions or lack thereof.

At the start of a tracking session, if the reference point is not already predetermined, the reference point may be set for exemplary purposes at the beginning of a tracking session by communication between the monitoring apparatus and portable location tracking device. The reference point will be a particular location within the map. Since maps may be custom, by the uniqueness of the map the reference point is then also custom. This means that the reference point is random and specific to the specific map, and not known to an unauthorized third party. Where stock or widely available maps are used, a custom reference point must be determined to preserve the security of the present invention.

Once the tracking session begins, communication of current location from the portable location tracking device to the monitoring apparatus may be achieved by transmission of offset from the reference point. Since the reference point is only known by authorized devices, an unauthorized device that intercepts the offset will be unable to determine an actual physical location. As the portable location tracking device is moved about, the determination of the guidance zone is made by determination of the present location using GPS or equivalent signals. Identification of the corresponding table location is made by calculating the latitudinal and longitudinal offsets from the reference point, and using these offsets as the two indices for a double-indexed array. The value retrieved from the double-indexed array identifies the guidance zone. Based upon either or both of portable location tracking device location history and the guidance zone value returned from the table, a variety of actions may be triggered within the portable location tracking device, such as providing appropriate stimuli, communicating a current zone value, or communicating current offsets from the reference point. These same offsets from the reference location are what is transmitted, when so desired, to the monitoring apparatus, which may also then determine what guidance zone the portable location tracking device is located within.

In a first manifestation, the invention is, in combination, a portable location tracking device and a monitoring apparatus. The portable location tracking device has a GPS location determination apparatus configured to determine an instantaneous latitude-longitude location of the portable location tracking device; memory containing a two-dimensional data array corresponding to longitude and latitude; a secret reference point within the two-dimensional array that is privately shared with the monitoring apparatus; and a data exchange apparatus configured to transmit an offset between the instantaneous latitude-longitude location of the portable location tracking device and the secret reference point. The monitoring apparatus has: a data exchange apparatus configured to receive the offset between the instantaneous latitude-longitude location of the portable location tracking device and the secret reference point from the portable location tracking device data exchange apparatus; and memory containing a two-dimensional data array corresponding to the portable location tracking device two-dimensional array, and the privately shared reference point within the monitoring apparatus two-dimensional array corresponding to the portable location tracking device secret reference point. The monitoring apparatus is configured to apply the received offset between the instantaneous latitude-longitude location of the portable location tracking device and the secret reference point to the privately shared reference point within the monitoring apparatus two-dimensional array and thereby determine the instantaneous latitude-longitude location of the portable location tracking device.

In a second manifestation, the invention is a method of securely transmitting an instantaneous location of a portable location tracking device to a monitoring apparatus. According to the method, a two-dimensional data array representing longitude and latitude is generated within each of the portable location tracking device and the monitoring apparatus. A privately held reference point within the generated two-dimensional data array is stored into each of the portable location tracking device and the monitoring apparatus. An offset between a data table representation of an instantaneous location of a portable location tracking device and the privately held reference point is transmitted to the monitoring apparatus. The transmitted offset is applied to the monitoring apparatus two-dimensional data array reference point to locate the data table representation of an instantaneous location of the portable location tracking device.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a safe and secure apparatus for monitoring the location of a portable location tracking device. From the descriptions provided herein and the teachings incorporated by reference herein above, it will be apparent that the present invention may be applied in certain instances to humans, livestock, pets, wild game, or other animals, machinery, and other diverse apparatus. A second object of the invention is to provide a fully self-contained apparatus that will determine location and take various appropriate actions or inactions based upon that location for extended periods of operation. As a corollary, the fully self-contained portable location tracking device is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously apply a portable location tracking device to a subject to be tracked, whether the subject is animate or inanimate, with minimal training time and knowledge required for proper and effective use of the apparatus. Yet another object of the present invention is to enable the establishment of an acceptable area or "safe zone" which may have very complex geometry using only the self-contained portable location tracking device, and to adjust or redefine the area again by simple manipulation of the self-contained portable location tracking device. An additional object of the invention is to enable the self-contained portable location tracking device to automatically generate a number of zones that facilitate desired use and generation of action, including when so desired a set of progressive zones that may share a common action that escalates as the zones are progressively penetrated. An even further object of the invention is to facilitate very secure and very low-power communication from a portable location tracking device to a monitoring apparatus on an "as-needed" basis that may for exemplary and non-limiting purpose include one of status, current zone, or offset from a reference point. As a corollary thereto, transmissions from the portable location tracking device are preferably brief, normally infrequent, and encoded in such a way as to foil cryptographic decoding and decryption.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides communication of current location from a portable location tracking device to a monitoring apparatus by transmission of offset from a previously communicated and securely shared reference point.

Figure 1:
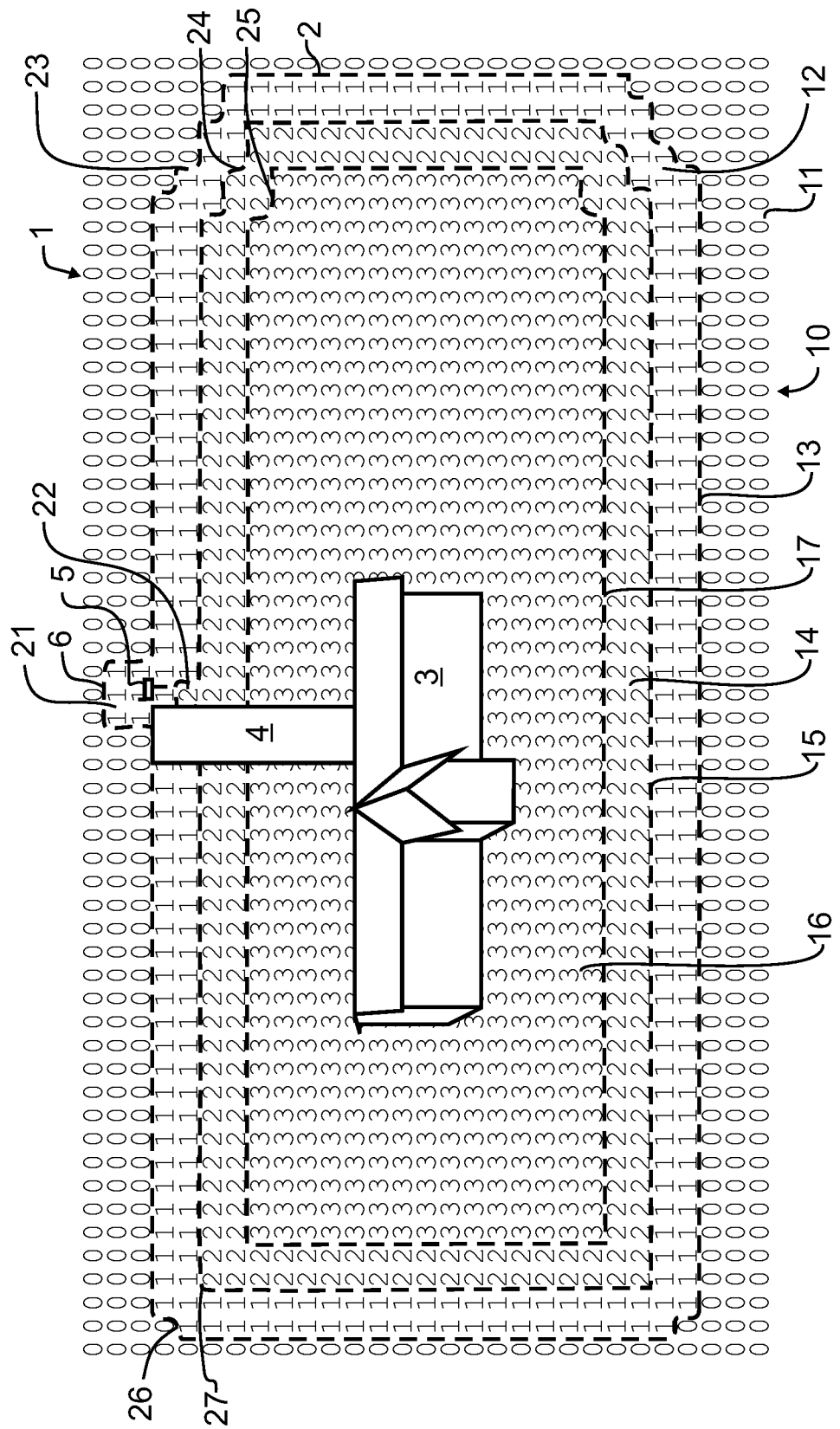
FIG. 1 illustrates a map of numerical values visually overlaid onto and electronically associated with an exemplary property such as might be mapped in accord with the teachings of the present invention.

In a preferred embodiment wireless location assisted zone guidance system 100 designed in accord with the teachings of the present invention, a person might want to monitor a child, pet, wild game, machine, or other animate or inanimate object located within an example property 1 such as that illustrated in FIG. 1. An outer limit of the property 2 may encompass one or more buildings 3, a driveway 4, and a mailbox 5. For exemplary purposes, a mailbox may be located on a small peninsula 6 which could extend beyond the bounds of the particular property location.

Figure 3:
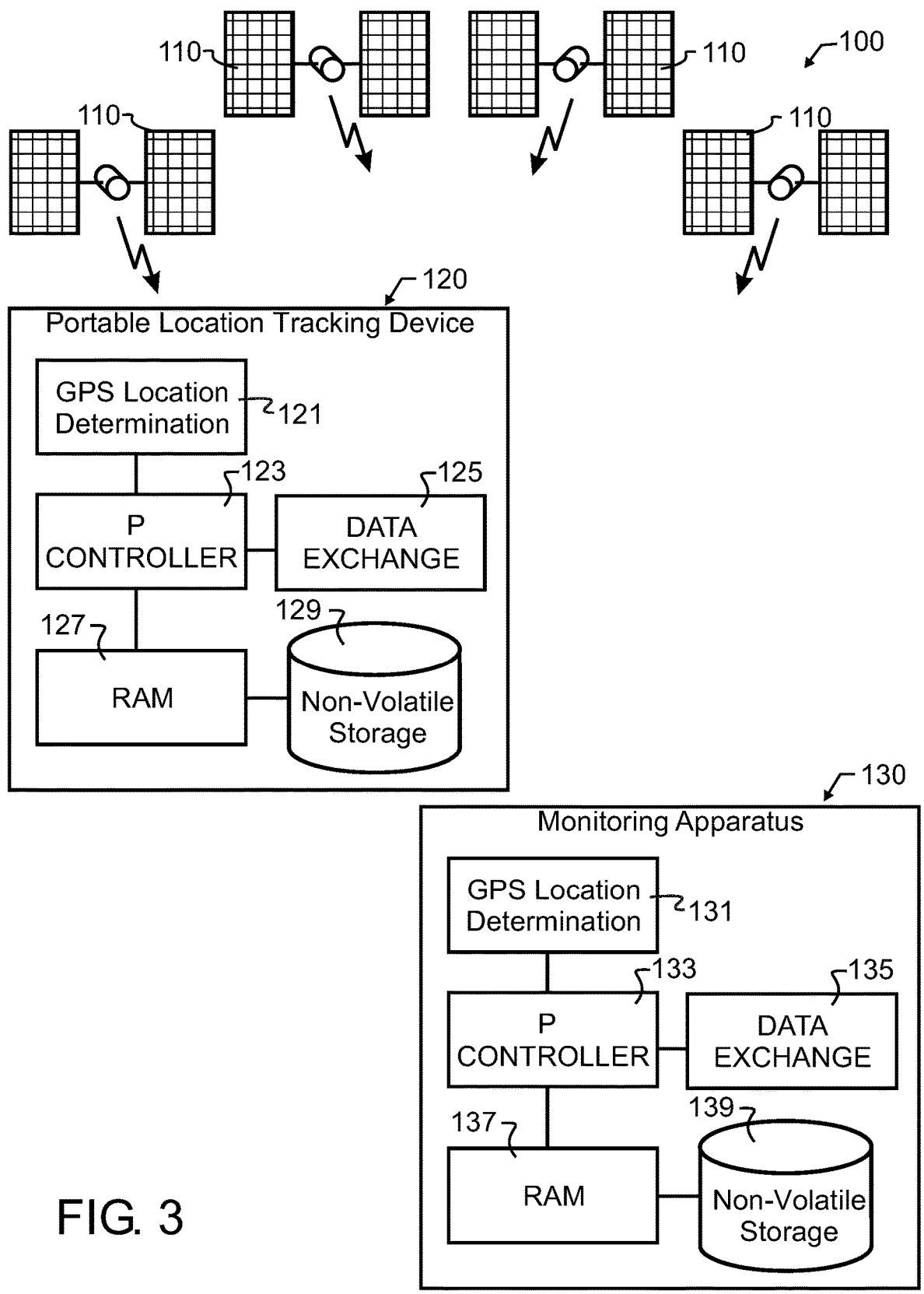
FIG. 3 illustrates the preferred embodiment self-contained portable location tracking device in further combination with a plurality of satellites and a wireless communications monitoring apparatus.

A self-contained portable location tracking device 120, which might for exemplary purposes and not solely limiting thereto resemble that illustrated in FIG. 3, will preferably contain the necessary electronic components to perform a number of tasks as described herein. Some exemplary components include: components to receive and decipher location determining signals through GPS location determination apparatus 121; a microprocessor, programmable logic controller, or any other equivalent or suitable apparatus 123; a data exchange apparatus 125 which might comprise a radio or other communications hardware; and also preferably both volatile and non-volatile memory such as RAM 127 and non-volatile storage 129.

In the preferred embodiment wireless location assisted zone guidance system 100 as illustrated in FIG. 3, a plurality of satellites 110 transmit GPS signals, which may then be received and converted to latitude and longitude references by the GPS location determination apparatus 121. These latitude and longitude references are then communicated from GPS location determination apparatus 121 to microprocessor 123. While latitude and longitude references are preferred, in alternative embodiments any suitable coordinate reference representative of a geographic area may be used.

A new area may be established such as described in greater detail in my U.S. Pat. No. 9,795,118 and published application 2015/0216142 incorporated herein above by reference, or by any other suitable technique. In one embodiment described therein, outer limit 2 is traversed, while the GPS location determination apparatus 121 and microprocessor 123 track these locations and store them in either or both of RAM 127 and non-volatile storage 129. In an alternative embodiment, maps created upon or stored within various computing devices may be transferred through data exchange 125 and microprocessor 123 to either or both of RAM 127 and non-volatile storage 129.

Next, microprocessor 123 or other suitable processor will preferably automatically convert this outer limit 2 into a table 10 of values such as illustrated for exemplary purposes in FIG. 1. The embodiments disclosed herein may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices.

While the numerals 0-3 illustrated in table 10 are used therein for the purposes of the present illustration, any suitable designations, whether numeric or not, may be used. As but one example, the numerals 0-3 represent four choices, and so may easily be represented by two bits of data. In such case, the possible combinations are binary 00, 01, 10, and 11. Furthermore, the present invention is not limited solely to four choices, and any number of choices, including both more and fewer than four, determined by a designer to be appropriate for the apparatus that is otherwise generally compliant with the remainder of the present description will be understood to be incorporated herein.

While FIG. 1 illustrates an exemplary outline of an area, which is a subset of the total property, the area can be of any geometry, and in the example is somewhat irregular.

In the preferred embodiment wireless location assisted zone guidance system 100, a number of different zones are defined based upon the traversal of outer limit 2 during initial setup. The area beyond outer limit 2 is defined by an "out-of-bounds" zone 11 represented by a numerical value of zero at each discrete data table location Immediately inside of the zero-value locations is a zone of locations assigned a numerical value of one. This will be referred to herein as the "second alert zone" 12. Between "out-of-bounds" zone 11 and "second alert zone" 12 in FIG. 1, a dashed line 13 has been drawn for illustrative purposes. This line does not actually exist in stored data table 10, but instead helps to better illustrate the various zones that are defined by the various location values.

A plurality of discrete locations relatively inward from the second alert zone 12 are assigned a numerical value of two, and represent a "first alert zone" 14. Again, for the purpose of illustration only, a dashed line 15 is shown separating first alert zone 14 from second alert zone 12. Again, and like line 13, this line 15 does not actually exist in the stored data table, and is provided solely for illustrative purposes.

Finally, an innermost "safe zone" 16 preferably intentionally encompasses the largest area of all zones and is populated with discrete location values assigned to equal the numerical value of three. Dashed line 17, like lines 13 and 15, indicates the separate zones, but does not exist in the stored data table.

As is evident when reviewing FIG. 1, line 13 corresponds approximately to outer limit 2 and so is shared by both reference numerals. Due to the discrete nature of the resolution of the particular position determining system, such as a GPS system in preferred embodiment wireless location assisted zone guidance system 100, the points defined during the traversal of outer limit 2 may or may not exactly correspond to the land location. In addition, since outer limit 2 may not be linear, and may instead include a number of irregularities such as peninsula 21 and slightly cropped corners 23 and 26 referenced in FIG. 2, the data points more interior but generally adjacent to these irregularities will have variability in their associated geometries relative to that of the outer limit 2. So, and again for exemplary purposes, peninsula 21 is too narrow to provide for the as-illustrated exemplary two data point width provided for each zone. Nevertheless, there is a single data point of numerical value 2 protruding at reference numeral 22 illustrated in FIG. 2. Consequently, as outer limit 2 was traversed at set-up, a self-contained portable location tracking device 120 may reach the base of mail box 5, which is located at this single data point of numerical value 2 at reference numeral 22, without passing into the second alert zone. Nevertheless, the self-contained portable location tracking device 120 will still pass into the first alert zone, and an action associated with the first alert zone will be initiated and carried out. Similarly, the intricacies of notched corner 26 are lost as the corner becomes a simple square corner at reference numeral 27 of FIG. 2. Likewise, the elaborate stepping of cropped corner 23 fades some to simpler corner 24, and becomes a very simple single curve at more interior corner 25.

Also strictly for the purpose of illustration, and not limiting the invention solely thereto, two GPS location points are used as the width of each of the first alert and second alert zones. Consequently, in the embodiment as illustrated, each of these first alert and second alert zones are calculated to be approximately two GPS points in width. It will be understood herein that the width of the alert zones may be predetermined to be more or less than the exemplary and illustrated two data points. Furthermore, the number of alert zones may be varied from the two zones that are illustrated.

While the alert zone areas are, in fact, two data points wide, the width of the alert zones at sharp transition points, such as corners, may be greater or less than two data points in width. The particular decisions for how to shape interior zones will be determined by algorithms chosen or written by a designer at design time. Furthermore, there may be times where assisted guidance zones may take on a very irregular shape. This can occur, for exemplary purposes, when there is a narrow peninsula between two larger safe zones. When there is not sufficient room for the predetermined number of alert zone location points, such as within peninsula 21 of FIG. 1, in the preferred embodiment the data point calculations still begin with the second alert zone value adjacent to the "out of bounds" area. This presents consistent operation near the borders, and provides more consistent system behavior, which in some cases may be very important.

As may be apparent, a person may choose where to traverse in order to control the formation of various zones. As an example, a person trying to create a larger buffer adjacent a high traffic road would, when setting up the zones, simply walk an outer limit farther from the edge of the road. This maintains more consistent alert zone widths, which is believed to offer better communication and training for animate beings than varying the width of the alert zones. Nevertheless, and alternatively, it is contemplated herein to allow a person, the system, or self-contained portable location tracking device 120 to vary the width of alert zones to correspond with various objects or hazards such as fences, gardens, and roadways.

Figure 2:
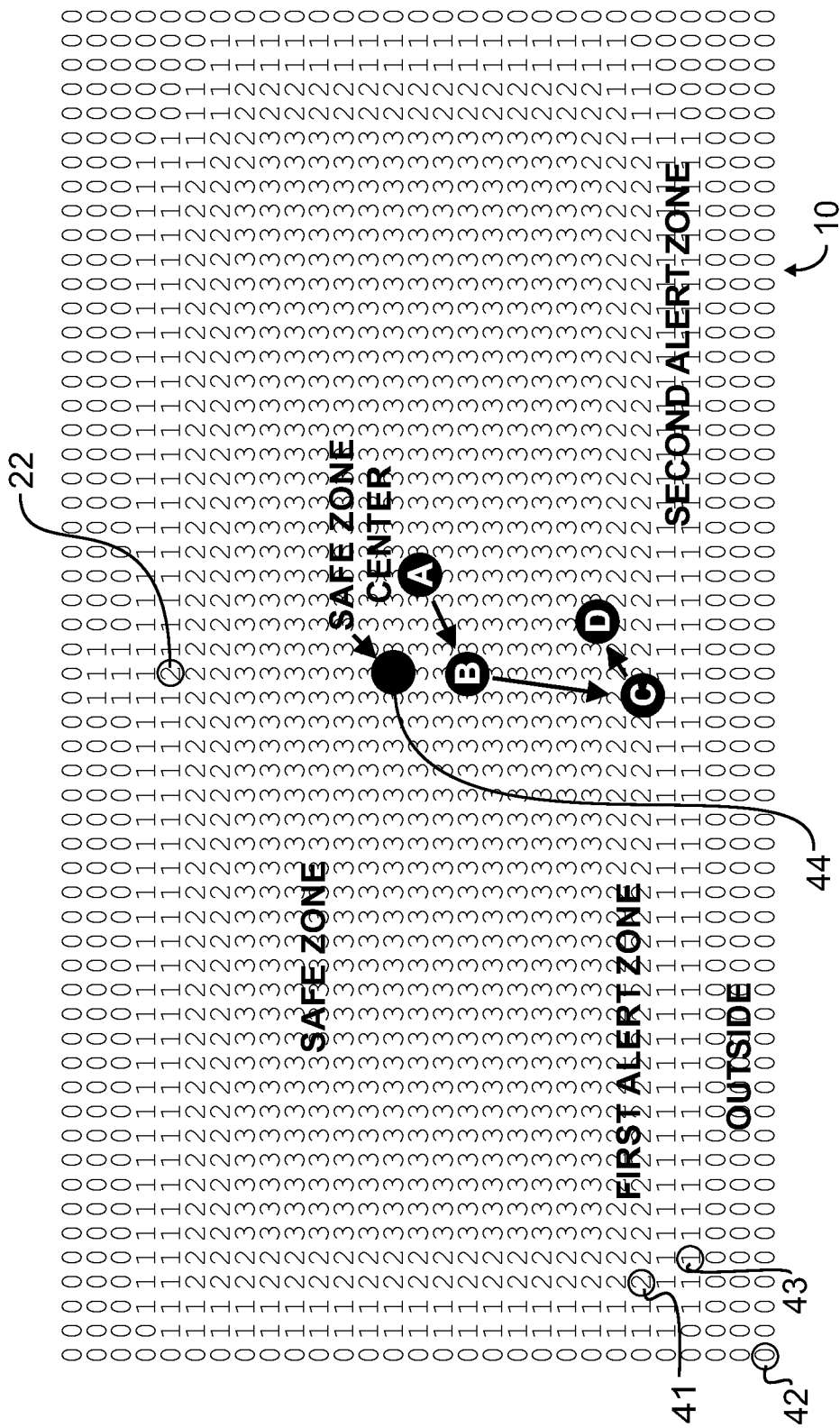
FIG. 2 illustrates alternative reference points and exemplary movement of a preferred embodiment self-contained portable location tracking device about the exemplary property of FIG. 1 as represented on the map of numerical values of FIG. 2.

FIG. 2 illustrates the data table 10 representation of the land area of FIG. 1, but without the land features shown. In accord with the present invention, a latitude and longitude land map is converted to and saved as an X-Y plot or table of points, where one axis (in this case the rows, also referred to as the abscissa) represents latitude and the other axis (in this case as illustrated, the columns, also referred to as the ordinate) represents longitude. Each point is then assigned a numerical value that is representative of a zone within the assisted guidance region.

These points may for exemplary purposes and in accord with the preferred embodiment, correspond to specific points of geographic latitude and longitude determined to a particular degree of resolution. The degree of resolution may typically be the limit of precision available for a particular location system, such as six decimals of precision in a GPS system. So, as represented in FIG. 2, the latitude and longitude representations are presented to six decimal precision, though other suitable levels of precision are considered incorporated herein.

Noteworthy herein is the fact that the data points do not correspond to an exact measure in feet or inches. Instead, and as known in the industry of mapping, a single second of longitude at the equator is the equivalent of approximately 101 feet. In contrast, a single second of longitude at sixty degrees north latitude, which is approximately the location of Oslo, Norway; Helsinki, Finland; and Anchorage, Alaska; is only approximately 51 feet. Taken to the extreme, at the north and south poles, a second of longitude is zero feet. For prior art systems attempting to calculate distances in feet or inches, this deviation of longitudinal distance as the collar moves away from the equator drastically increases the complexity of calculations required. In contrast, the present invention directly associates GPS data points with zones, and disregards the distance in feet or inches that this may be equivalent to.

Storage of data table 10 requires memory, and a suitable electronic system within self-contained portable location tracking device 120 will not be provided with unlimited memory within which to store data points. The particular type of memory selected is well within the level of skill of a designer of portable devices using micro-processors, micro-controllers and the like, and the invention is not limited to a single or particular type of memory. In accord with a preferred embodiment of the system, the memory will be divided into some combination of slower non-volatile storage 129 and relatively faster but volatile RAM 127. The slower, non-volatile memory for exemplary but non-limiting purposes might comprise well-known flash memory.

A reference location within table 10 will be determined. This reference location may be any position within the table. For exemplary and non-limiting purposes, a reference location will be selected from the centroid 44 of the intended safe zone as labeled in FIG. 2, the minimum latitude and longitude of the zone or data table, or even some other location entirely. For the purposes of illustrating the present preferred embodiment wireless location assisted zone guidance system 100, the lower-left corner may be understood to be the reference location, identified as reference point 42 in the illustration of FIG. 2.

The data table 10 populated with zone values as illustrated in FIGS. 1 and 2 needs to be stored within both self-contained portable location tracking device 120 and monitoring apparatus 130. This may be achieved through any suitable communication, such as through a communication invoked between tracking device data exchange 125 and monitoring apparatus data exchange 135. While any means of communication may be invoked, alternatives to unencrypted wide area radio communications are preferred for enhanced security.

For exemplary and non-limiting purpose, one approach is the use of encryption techniques, for exemplary and non-limiting purposes such as are common in Internet and data communications today. One such known standard is the Transport Layer Security (TLS) encryption, though there are many other standards and techniques. In some embodiments, a secure server invoking TLS encryption may store one or more maps, and may be accessed by both self-contained portable location tracking device 120 and monitoring apparatus 130.

Another approach is the use of a local communications channel. Again for exemplary and non-limiting purpose, Near Field Communication (NFC), direct wired connection, or other alternative communications channel may be used to provide an initiation of both devices 120, 130, such as a transfer of the reference point and map of zones.

Noteworthy is the fact that many of these communications techniques are not mutually exclusive. In consideration thereof, they may be combined for further security enhancement. Consequently, and again for exemplary and non-limiting purpose, in some embodiments the data transmitted during an NFC exchange will be further encrypted so that even if another device is close enough in proximity to detect the NFC exchange, the data will still be unuseable without decryption.

By invoking this initial transfer using an alternative mode of communication, particularly one such as the direct wired connection or NFC that is much less susceptible to being externally hacked, a third party will not have access to data table 10 or a reference point such as either of the safe zone centroid 44 or reference point 42.

In some embodiments, the reference point is randomly or pseudo-randomly generated by one or the other of the devices 120, 130 during the exchange therebetween, rather than having been stored on either device beforehand. In addition, where multiple devices within a single guidance region may be monitored by one monitoring apparatus 130, in some embodiments it is preferable to use a random or pseudo-random generator with the generation of reference point for each self-contained portable location tracking device 120. In this case, a security breach of one self-contained portable location tracking device 120 will not enable a hacker to access the location of any other self-contained portable location tracking device 120.

In some embodiments, in addition to exchanging the reference point between self-contained portable location tracking device 120 and monitoring apparatus 130, a pre-shared key will also be exchanged. This key can then be used as known in the field of cryptography to facilitate encryption of the offset from reference.

Once data table 10 and a suitable reference point such as reference point 42 have been shared between self-contained portable location tracking device 120 and monitoring apparatus 130, or otherwise established, preferred embodiment wireless location assisted zone guidance system 100 can begin operation.

When operational, self-contained portable location tracking device 120 will receive GPS signal transmissions from a plurality of satellites 110, typically three or more satellites. The received signals are converted by GPS location determination apparatus 121 into latitude and longitude references, which are then forwarded to and received by microprocessor 123. Microprocessor 123 will use the current latitude and longitude signal forwarded from GPS location determination apparatus 121 to find the location within data table 10 corresponding to the current location.

The offset determination may be as simple as a simple subtraction of the reference location, such as reference point 42 of FIG. 2, from the currently determined location. Then, this difference is used as the table index, to directly address the particular table location. In the preferred embodiment, each data point is stored in memory using a double-indexed array, with each of the two indices of the array uniquely representing one of the latitudinal or longitudinal offset from the reference point. For exemplary purposes, this may be written as ArrayName[latitude-offset][longitude-offset]. Each unique [latitude-offset][longitude-offset] may for exemplary purposes point to a unique location in memory where the zone value associated with that geographic location is stored.

In an alternative embodiment, the offset may be additionally converted in a proportional or scalar calculation, where a particular number of degrees of latitude, for example, are known to equal one data point shift to the right in table 10. This requires storing the scalar conversion and an extra scalar calculation to look up the data value for a location, both which may be undesirable for some applications.

Once the offset is calculated, then microprocessor 123 will query the memory location and the contents of the memory are returned. For exemplary and non-limiting purpose, the contents may be in the form of a numerical value from 0-3, the meaning which represents whether the self-contained portable location tracking device 120 is comfortably within the safe zone ("3" in the preferred embodiment), or is in the first alert ("2" in the preferred embodiment), second alert ("1" in the preferred embodiment), or out-of-bounds zones. After GPS location is determined, the only calculation required during operation of self-contained portable location tracking device 120 to determine whether device 120 is within an assisted guidance zone is the calculation of offset in latitude and longitude from the reference point, such as reference point 42 in the lower left corner of table 10. This is a very rapid and easy calculation, followed by a near-instantaneous read of the memory contents. In the preferred embodiment wireless location assisted zone guidance system 100 then, all numerical representation calculations are performed at the time the outer limit is defined, and then these numerical representation tiles are saved, preferably in non-volatile storage 129 such as within EEPROM, flash memory, or equivalent storage. Saving in non-volatile storage 129 allows the stored map to be used at a later date, even if the battery should fail in the interim.

The procedure used to clear a map from non-volatile storage 129 is also quite simple in the preferred embodiment. Once the user selects to delete the map, the associated memory locations are simply rewritten to numerical values of zero; or simply deleted from a directory of memory or a file allocation table; or otherwise deleted as known in the field of computing.

When more than one map is desired to be saved, the data tables containing zone values may be swapped into and out of active memory as required. This means that storage of diverse locations does not require storage of every location in between. So, for example, storage of two distinct one acre maps on opposite sides of the earth does not require storing millions of acres of maps. Instead, only the data table associated with a latitude and longitude actually needed is required to be stored in memory. While the use of these smaller data tables is not essential to the operation of the present invention, the ability to create these means that with only very modest amounts of memory and processing capability, the present invention may be used to map one or a plurality of assisted guidance regions literally anywhere on earth.

Using the teachings of the present invention, the self-contained portable location tracking device 120 may be designed to contain an entire and independent wireless location assisted zone guidance system. In other words, no additional components would need to be purchased or acquired, nor is there a need for any other external device other than the plurality of GPS satellites 110. Self-contained portable location tracking device 120 will preferably interact directly with GPS signals received from GPS satellites 110, and may for enablement use a commercially available set of components to determine latitude and longitude.

A number of other features may also desirably or optionally be incorporated into a preferred embodiment wireless location assisted zone guidance system 100. Some of these are described and set forth in my US patents and published applications incorporated herein above by reference.

In addition, in accord with the present preferred embodiment wireless location assisted zone guidance system 100, a monitoring apparatus 130 will also be provided. Monitoring apparatus 130 in preferred embodiment wireless location assisted zone guidance system 100 may for exemplary and non-limiting purpose have a GPS location determination apparatus 131; a microprocessor 133; a data exchange apparatus 135; RAM 137; and non-volatile storage 139. GPS location determination apparatus 131 is optional and not required for the operation of self-contained portable location tracking device 120, but may offer benefit in some situations, such as the physical tracking of self-contained portable location tracking device 120 with a portable monitoring apparatus 130.

As noted herein above, the provision of data exchange apparatuses 125, 135 allows assisted guidance region maps and reference point to be communicated from an external computing device. This may be from another self-contained portable location tracking device 120, a monitoring apparatus 130, or from a cellular telephone or various other mobile or fixed computing devices. To facilitate such transfer, self-contained portable location tracking device 120 and monitoring apparatus 130 will preferably be provided with a local interface, such as through data exchange apparatus 125, 135. The local interface may be of any suitable type, including but not limited to wireless Bluetooth™, NFC, cellular, or other type of radio or alternative communications link, or wired communications channel.

Once a reference point and data table have been transferred between or to both of self-contained portable location tracking device 120 and monitoring apparatus 130, the only data required to be transferred from a self-contained portable location tracking device 120 to a wireless communications monitoring apparatus 130 is the number of map points offset from the reference point that represents the current location of portable location tracking device 120. In other words, if the portable location tracking device is at position 41 in FIG. 2, this location is offset from reference point 42 by three points along the X-axis or abscissa, and six points along the Y-axis or ordinate. Portable location tracking device 120 may simply transmit the offset from reference as the two integers "3" and "6" sequentially. Upon receipt of "3 6", wireless communications monitoring apparatus 130 through microprocessor 133 will calculate the "3 6" offsets using data table 10 to determine the exact location of portable location tracking device 120, and can additionally immediately assess that self-contained portable location tracking device 120 is located in the first alert zone. If this location is intended to initiate some action, event, or sequence of events within wireless communications monitoring apparatus 130, then through control of microprocessor 133 such action, event, or sequence will be initiated. As a further example, position 43 might be represented by offsets of four and three, or simply "4 3".

As portable location tracking device 120 moves from location to location, GPS location determination 121 continues to provide location information to microprocessor 123. As a result, portable location tracking device 120 is location-aware, and with changes in either time or location, portable location tracking device 120 will autonomously check the onboard map to determine a zone value, and act, if needed.

Since status processing happens locally within portable location tracking device 120, the device only needs to communicate when there is a problem or action required at monitoring apparatus 130, to give infrequent time-interval based updates to confirm proper operation and signal lack of problem or action required, or to reply to a request for position from monitoring apparatus 130. In addition, there may be times where an action is initiated by some combination of current location, location history, and time.

The transmission by portable location tracking device 120 may simply be a signal representative of the two offset numbers. There are several benefits to this extremely compact transmission of the two numbers, including battery preservation and location security.

A short and compact transmission requires very little power, so batteries will last longer. This is very complementary to the portable location tracking device 120 being autonomous and location aware, and so also requiring very few transmissions. This combination of few and compact transmissions provides very little drain on batteries.

Another benefit of the compact transmission of the two offset numbers is that a third party receiving the transmission will not have enough information to reveal the location of the portable tracking device without also knowing the reference point. Therefore, location security is preserved even if third parties may intercept the transmission from portable location tracking device 120. In addition, a short and compact transmission is also much more difficult to locate through triangulation or other technique, meaning the location of portable location tracking device 120 is extremely difficult to discern by untrustworthy third parties. Therefore, a short "burst" transmission at infrequent intervals both improves battery life and greatly enhances security of preferred embodiment wireless location assisted zone guidance system 100.

As already described, the transmission may simply be the data offset. However, there are several techniques that in some embodiments of the present invention will provide even greater security. As noted herein above, the data being transmitted may be encrypted data. Consequently, the "3 6" transmission may be encrypted, such as with the encryption key exchanged with the initiation between self-contained portable location tracking device 120 and monitoring apparatus 130. In further embodiments, the data transmission may also include new encryption keys, resulting in an ever-changing encryption.

In other embodiments, the offset may be calculated not only as the offset from the reference point, but additionally adjusted using a pseudo-random generator. If these offsets are altered in a known way, such as being further offset by a pseudo-random number generator that can be sequenced identically at both self-contained portable location tracking device 120 and monitoring apparatus 130, then monitoring apparatus 130 can subtract out the pseudo-random offset to thereby calculate the actual or real offset value detected by self-contained portable location tracking device 120.

Encrypting the offset from reference using a cryptography key requires greater calculation and associated battery consumption, but the pseudo-random generated offset provides enhanced security. As a result, encryption established at initiation between self-contained portable location tracking device 120 and monitoring apparatus 130 or later through encryption keys being exchanged at one or more communications therebetween can even eliminate sophisticated attempts to hack the location of a self-contained portable location tracking device 120.

As described above, in an alternative embodiment, the offset may be additionally converted in a proportional or scalar calculation, where a particular number of degrees of latitude, for example, are known to equal one data point shift to the right in table 10. This requires storing the scalar conversion and an extra scalar calculation to look up the data value for a location. In a further alternative embodiment of the present invention, this scale factor can be leveraged to improve security and battery life further.

In this embodiment, the scale factor is transferred between or to each self-contained portable location tracking device 120 and monitoring apparatus 130 at or about the same time as the data table 10 and reference point are provided. This scale factor will further obfuscate the location of portable location tracking device 120. For exemplary purposes, if the scale factor is 16, the accuracy of the location would be about 1 meter at 45 degrees in latitude. However, if the scale factor is higher, then the accuracy would be lower. This has two benefits. First, a third party recipient of the transmitted offset would have no idea what the scale factor would be, so even if they knew the pre-shared reference location, they still would not know the actual location of the person. Secondly, as the scale factor increases, the amount of times a portable location tracking device 120 would need to transmit goes down, which saves on battery.

While the two number (Lat-Lon offset) transmission described herein above is most compact, sending the two offsets in sequence and without any separator risks confusion. For example, if there are a total of three digits transmitted there is uncertainty whether the middle digit might apply to latitude offset or to longitude offset. Consequently, there will preferably be either a short time gap in the transmission or other predetermined separator signal or character between the two offsets. In addition, a predetermined "finished" or "end of transmission" signal can avoid the risk of misinterpretation of the data if a signal were lost or truncated before complete transmission.

In some embodiments, the separator characters are randomly generated noise, but are located in predetermined positions with predetermined length. For exemplary and non-limiting purpose using position 41 in FIG. 2, having a location offset from reference point 42 by three points along the X-axis or abscissa, and six points along the Y-axis or ordinate, the previously described transmission would be "3 6". Again for exemplary and non-limiting purposes, by assigning the first, third, and fifth characters as noise values, the transmission might then be "N3N6N", where "N" represents a randomly generated noise character. Again as just a single example, a literal conversion of the "3 6" position 41 could be "$3J69". The monitoring apparatus 130 knows to strip the first, third, and fifth characters, once again revealing "3 6". However, to a third party, the string of data "$3J69" appears to be an encrypted string such as would be created by the earlier embodiment described above using TLS or other encryption. Yet, should the third party hacker try, the string will not be decrypted using any key.

In other embodiments, additional characters may be inserted using a pseudo-random generator. In such case, and as long as self-contained portable location tracking device 120 and monitoring apparatus 130 are both provisioned with like generators, even positions of noise characters, or alternatively position data characters, in some embodiments and lengths of noise characters in some embodiments may be varied as controlled by the pseudo-random generator. Once again, the transmitted data will visually appear to be a string of unintelligible characters without knowledge of the reference point and pseudo-random generator.

In yet other embodiments, the reference point itself is changed according to a reproducible pattern, such as a predetermined sequence or again a sequence of pseudo-randomly selected locations within the data table. Again for exemplary and non-limiting example, the reference point at a first transmission is point 42 in FIG. 2. In such case, if self-contained portable location tracking device 120 is at point 41, the transmission as noted above is "3 6". If there is predetermined agreement for rolling reference points, a second transmission might use point 43 of FIG. 2 as the reference point. In such case, and with no change in position of self-contained portable location tracking device 120, meaning it remains at point 41, the offset transmitted by the second transmission would be "−1 2".

It is appropriate to note that in any embodiments where pseudo-random generators or rolling references are used, each transmission either requires confirmation of receipt from monitoring apparatus 130 be returned to self-contained portable location tracking device 120, or there must be transmitted an identifier of the number of the transmission. Otherwise, even if only one transmission is dropped from self-contained portable location tracking device 120 to monitoring apparatus 130, any further data received by monitoring apparatus 130 would truly be unintelligible.

In yet other embodiments, two-factor authentication between self-contained portable location tracking device 120 and monitoring apparatus 130 may be used to relocate the reference point.

Each of these embodiments that alter the transmission of offset from the basic "3 6" approach share a common overriding characteristic. Each approach starts with an already cryptic reference point offset, the "3 6", and adds to that various forms of noise that further obfuscate the content.

While encryption-decryption algorithms, pseudo-random sequences, random or pseudo-random data fill, moving reference points, and rolling codes are described herein above, those skilled in the art will recognize that any suitable obfuscation or encryption technique may be added to the already cryptic reference point offset data. When executed well, interception of the signal will only yield what appears to be noise, and even after passing the data through any single conversion or decryption technique, will still yield what appears to be noise. Those familiar with obfuscation or encryption techniques may in some embodiments generate well-distributed noise within or in combination with the data, yielding a resulting transmission resembling Gaussian noise.

In situations where there may be more than one portable location tracking device 120 operating within an allocated communications channel, and where these tracking devices may potentially overlap in location, a "station identifier" that is unique to each portable location tracking device 120 will also preferably be transmitted. This avoids confusion over which portable location tracking device 120 is transmitting. However, in those embodiments where either the communications channels can be kept separate, or the locations of the portable location tracking devices 120 will be unique to a particular device and not be shared by two devices, then the station identifier will not be required.

In preferred embodiment wireless location assisted zone guidance system 100, the signals are transmitted uni-directionally from portable location tracking device 120 to any device equipped to receive the signal. As described herein above, this preserves a short transmission burst, and improves security of the system.

Nevertheless, in alternative embodiments, a bi-directional transmission may be desired or required. When so desired, an acknowledgment or the like may be transmitted from wireless communications monitoring apparatus 130 to portable location tracking device 120 to confirm receipt of a complete transmission. In addition, bidirectional communications enable monitoring apparatus 130 to query portable location tracking device 120 of status or location when so desired. For many applications, this ability to query may be highly desirable.

However, any benefits of bidirectional communication must still be weighed against potential loss of security. One attack vector is "pinging" portable location tracking device 120, to cause repeated transmissions that can be used to triangulate the location of portable location tracking device 120. The risk of this type of attack in some embodiments of the present invention is mitigated by limiting how often portable location tracking device 120 is allowed to respond to such queries through limits that may for exemplary and non-limiting purpose be set in software and enforced by microprocessor 123. In addition, in a bidirectional communications implementation of preferred embodiment wireless location assisted zone guidance system 100, there will most preferably be provided further encryption or "station identification", in some embodiments with further password or key validation or other known security techniques, making it much more difficult and time-consuming for adversarial access and location determination.

As aforementioned, there will preferably be multiple zones in the assisted guidance region. For exemplary and non-limiting purposes, in preferred embodiment wireless location assisted zone guidance system 100 these are illustrated in FIGS. 1 and 2 as the "safe", "first alert", "second alert", and "out-of-bounds" or "outside" zones, though there may be more or fewer zones, and alternative titles may be used to provide better description for a particular intended application of preferred embodiment wireless location assisted zone guidance system 100. Each of these zones may be used to initiate a particular action, sequence, or lack thereof.

There are many potential applications for a wireless location assisted zone guidance system designed in accord with the teachings of the invention. For exemplary and non-limiting purposes, in one embodiment a wearable "safe zone" alerting system monitors children and vulnerable adults. In a manner similar to that already described herein above with regard to the property of FIG. 1, and as illustrated for exemplary purpose also in FIG. 2, a region is identified, and then one or more progressive alert zones are established during the construction of a data table such as data table 10. The resulting data table and a pre-defined reference point are communicated to at least one self-contained portable location tracking device 120 and at least one monitoring apparatus 130. As also described herein above, self-contained portable location tracking device 120 is capable of fully autonomous operation. As a result, no communications are required while the monitored person moves about in the safe zone. This is illustrated in FIG. 2 as movement from location A to location B. No transmissions are initiated, and battery power is preserved. When desired, and if bidirectional communications are provided, monitoring apparatus 130 may also query the location of the person when needed or desired.

Continuing the exemplary cases of application to personal safety of children or the elderly, if the monitored person leaves the an area defined by data table 10 as being safe, which might for exemplary purposes be an area within the building or grounds where they reside, they may optionally be notified with a voice message, tone, vibration or other gentle reminder that they are wandering astray. This movement is illustrated in FIG. 2 as movement from location B to location C.

At the same time, portable location tracking device 120 is preferably configured to provide a short burst transmission containing the Lat-Lon position offsets to at least one monitoring apparatus 130. This provides immediate notification to family or medical staff that the person has left the safe zone. If the person were to continue to the second alert zone or beyond, other alarms or notifications may be generated by either or both of portable location tracking device 120 and at least one monitoring apparatus 130.

If the person then returns to the safe zone at location D, then portable location tracking device 120 may once more communicate with at least one monitoring apparatus 130 with the offset information, which can then be used within monitoring apparatus 130 to update both status and location.

As may be apparent, the preferred embodiment wireless location assisted zone guidance system 100 is similarly applicable to use within a fenced or even unfenced yard, for a child in a cart at the market, at the park, at the local soccer field, for the walk home from school, or even when visiting friends out of town. In any of these situations, a parent, guardian, or staff will be immediately be notified if the monitored person wanders outside the safe zone.

The preferred embodiment wireless location assisted zone guidance system 100 is also very applicable to use by capable persons. A person running alone on a predetermined route and carrying self-contained portable location tracking device 120 will be notified should they make a wrong turn. In addition, a loved one or friend will immediately be notified as well through monitoring apparatus 130.

Other embodiments of the invention are applicable to and may be customized for other animate and inanimate objects, including but not limited to livestock, pets, wild game, or other animals, machinery, and other diverse apparatus.

Preferred embodiment wireless location assisted zone guidance system 100 is illustrated as having a safe zone and three subsequent progressive alert zones. Nevertheless, the present invention is not solely limited to a particular number of zones within an assisted guidance region, or a particular way to represent those zones. The numerical representations from zero to three are preferred, but any other representations that may be machine stored are contemplated herein.

While the preferred embodiment table 10 has been described herein above and illustrated in FIGS. 1-3 for the purposes of enablement as cooperative with a particular self-contained apparatus, it should be apparent that the table 10 incorporating discrete values representative of various zones may be used with other apparatus such as found in many other patents incorporated herein by reference above and other systems, as will be understood and appreciated by those skilled in the art.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a portable location tracking device and a monitoring apparatus,
    said portable location tracking device having:
        a GPS location determination apparatus configured to determine an instantaneous latitude-longitude location of said portable location tracking device;
        memory containing a two-dimensional data array corresponding to longitude and latitude;
        a secret reference point within said two-dimensional array that is privately shared with said monitoring apparatus; and
        a data exchange apparatus configured to transmit an offset between said instantaneous latitude-longitude location of said portable location tracking device and said secret reference point;
    said monitoring apparatus having:
        a data exchange apparatus configured to receive said offset between said instantaneous latitude-longitude location of said portable location tracking device and said secret reference point from said portable location tracking device data exchange apparatus; and
        memory containing a two-dimensional data array corresponding to said portable location tracking device two-dimensional array, and said privately shared reference point within said monitoring apparatus two-dimensional array corresponding to said portable location tracking device secret reference point;
    said monitoring apparatus configured to apply said received offset between said instantaneous latitude-longitude location of said portable location tracking device and said secret reference point to said privately shared reference point within said monitoring apparatus two-dimensional array and thereby determine said instantaneous latitude-longitude location of said portable location tracking device;
    wherein said data exchange apparatus is configured to add data noise to said offset transmission and thereby further obfuscate said instantaneous latitude-longitude location of said portable location tracking device within said transmission.

2. The combination portable location tracking device and monitoring apparatus of claim 1, wherein said portable location tracking device further comprises:
    at least one behavioral guidance stimulation apparatus;
    a processor; and
    a plurality of guidance zones defined using said latitude and longitude information, each one of said plurality of guidance zones having an associated unique set of characteristics used by said processor to provide behavioral guidance stimulation through said behavioral guidance stimulation apparatus;
    wherein each data value stored in said data table identifies a one of said plurality of guidance zones.

3. The combination portable location tracking device and monitoring apparatus of claim 1, wherein said secret reference point and privately shared reference point are both altered subsequent to at least one data transmission from said portable location tracking device data exchange apparatus to said monitoring apparatus data exchange apparatus.

4. The combination portable location tracking device and monitoring apparatus of claim 1, wherein said added data noise further comprises data resulting from the application of an encryption algorithm to said offset between said instantaneous latitude-longitude location of said portable location tracking device and said secret reference point.

5. The combination portable location tracking device and monitoring apparatus of claim 1, wherein said added data noise further comprises pseudo-randomly generated data fill.

6. A method of securely transmitting an instantaneous location of a portable location tracking device to a monitoring apparatus, comprising the steps of:
- generating a two-dimensional data array representing longitude and latitude within each of said portable location tracking device and said monitoring apparatus;
- storing a privately held reference point within said generated two-dimensional data array into each of said portable location tracking device and said monitoring apparatus;
- transmitting an offset between a data table representation of an instantaneous location of a portable location tracking device and said privately held reference point to said monitoring apparatus; and
- applying said transmitted offset to said monitoring apparatus two-dimensional data array reference point to locate said data table representation of an instantaneous location of said portable location tracking device;
- further comprising the step of adding data noise to said offset transmission and thereby further obfuscating said instantaneous location of said portable location tracking device within said transmission.

7. The method of securely transmitting an instantaneous location of a portable location tracking device to a monitoring apparatus of claim 6, further comprising the steps of:
- storing a value at each individual two-dimensional data array location representing a single behavioral guidance zone selected from a plurality of distinct behavioral guidance zones;
- storing a unique set of behavioral processes associated with each one of said plurality of distinct behavioral guidance zones in electronically accessible memory;
- electronically retrieving said stored value representing said single behavioral guidance zone from an individual array location defined by said latitudinal offset and said longitudinal offset; and
- electronically retrieving said unique set of behavioral processes associated with said stored value.

8. The method of securely transmitting an instantaneous location of a portable location tracking device to a monitoring apparatus of claim 6, wherein said step of adding data noise to said offset transmission comprises applying an encryption algorithm to said offset between said data table representation of an instantaneous location of said portable location tracking device and said privately held reference point.

9. The method of securely transmitting an instantaneous location of a portable location tracking device to a monitoring apparatus of claim 6, wherein said step of adding data noise to said offset transmission comprises adding pseudo-randomly generated data fill.

10. The method of securely transmitting an instantaneous location of a portable location tracking device to a monitoring apparatus of claim 6, wherein said step of adding data noise to said offset transmission comprises altering said privately held reference points subsequent to at least one transmission of said offset from said portable location tracking device to said monitoring apparatus.

\* \* \* \* \*